July 15, 1969     H. A. DALIK     3,455,190
AUTOMATIC FEEDING AND DISCHARGING SYSTEM FOR MACHINE TOOLS
Filed May 23, 1967     4 Sheets-Sheet 1
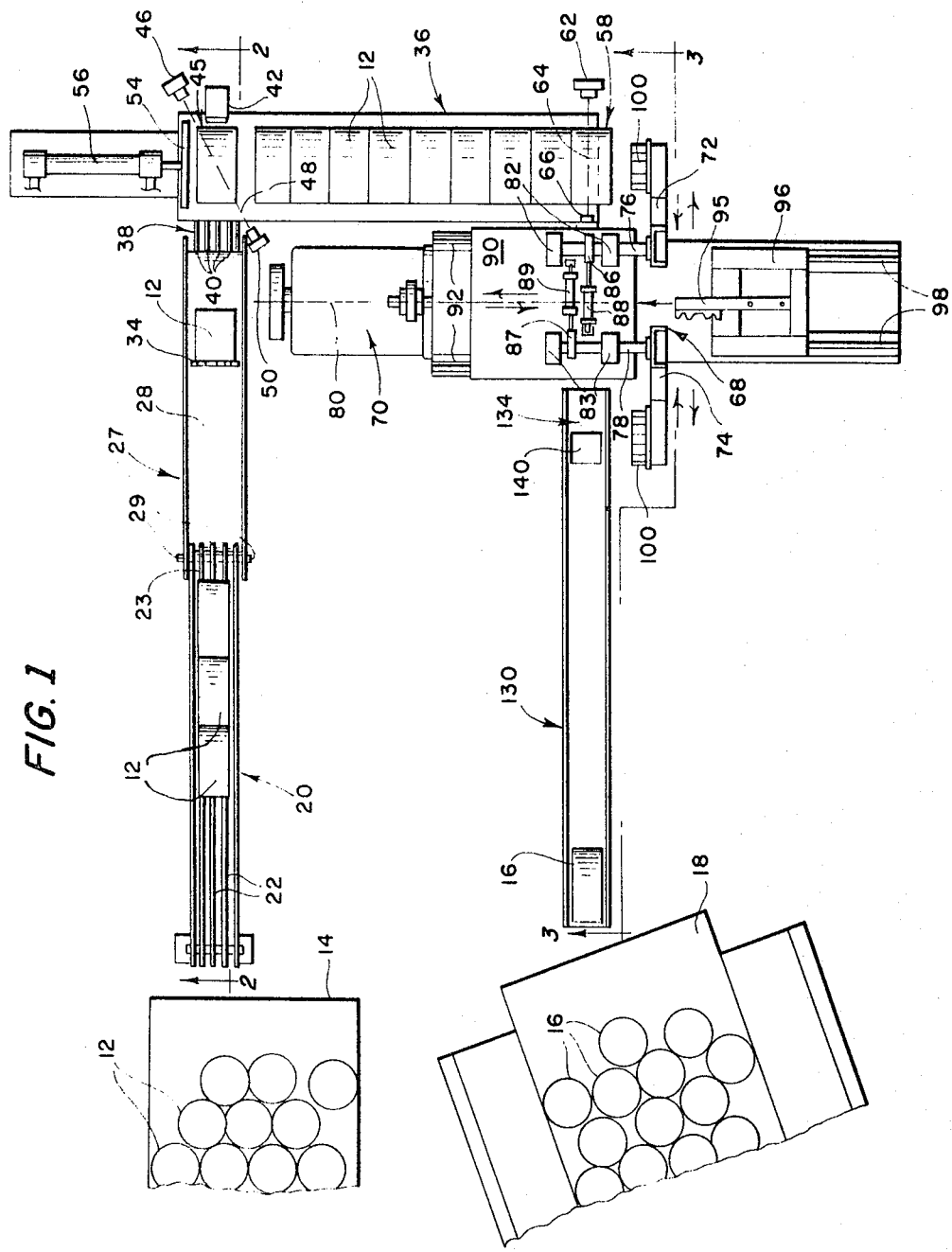
INVENTOR
HERBERT A. DALIK
BY *Finnegan & Henderson*
ATTORNEYS July 15, 1969   H. A. DALIK   3,455,190
AUTOMATIC FEEDING AND DISCHARGING SYSTEM FOR MACHINE TOOLS
Filed May 23, 1967                         4 Sheets-Sheet 2
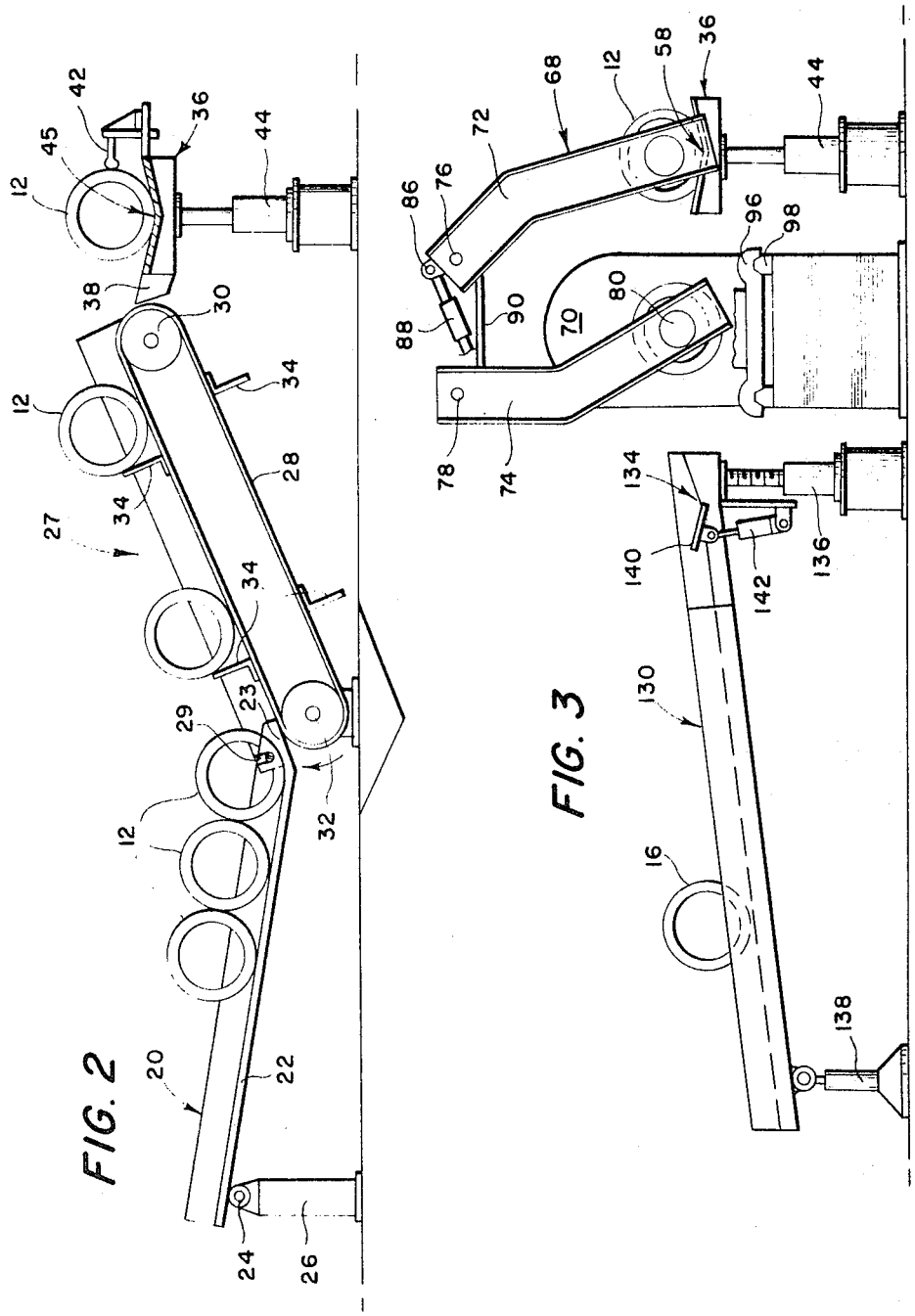
INVENTOR
HERBERT A. DALIK
BY *Finnegan & Henderson*
ATTORNEYS

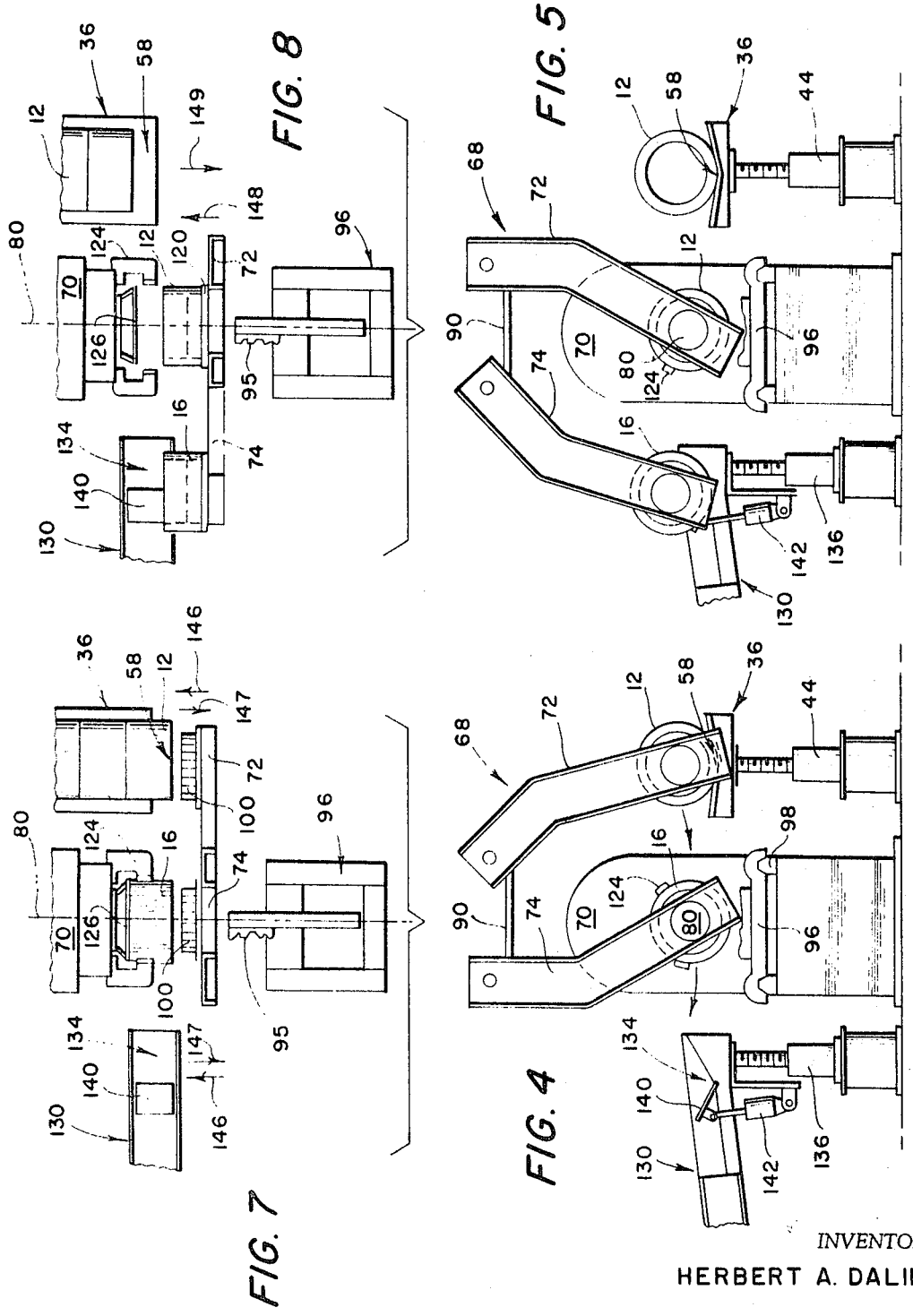

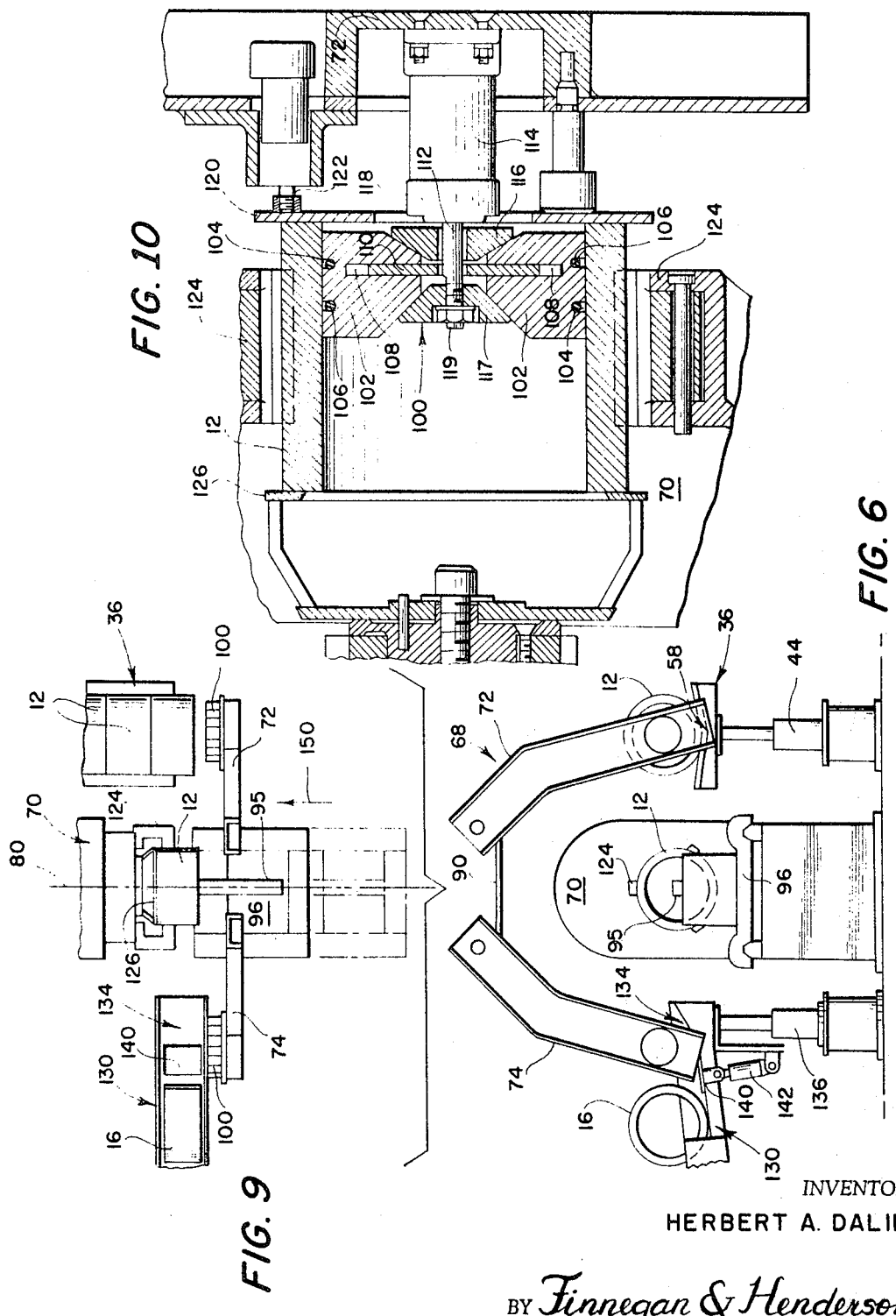

United States Patent Office 3,455,190
Patented July 15, 1969

3,455,190
AUTOMATIC FEEDING AND DISCHARGING
SYSTEM FOR MACHINE TOOLS
Herbert A. Dalik, Stow, Ohio, assignor to The
Flintkote Company, New York, N.Y., a corporation of Massachusetts
Filed May 23, 1967, Ser. No. 640,581
Int. Cl. B23b 15/00, 7/02; B23g 1/22
U.S. Cl. 82—2.7                                    8 Claims

ABSTRACT OF THE DISCLOSURE

An automatic system of machinery for mechanically handling and machining hollow cylindrical pipe couplings. The system automatically orients pipe couplings on a feed trough, feeds them one at a time in continuous sequence to the chuck of a machine lathe for internal machining, discharges machined couplings from the lathe, and removes the machined couplings from the system for transfer to storage or succeeding operations. A charge arm and a discharge arm are included in the system and are automatically controlled by cycling means to charge the machine lathe chuck with unmachined couplings and to discharge machined couplings from the chuck.

---

This invention relates to a system that automatically orients workpieces, feeds them in sequence to a machine tool, machines them, discharges them from the machine tool, and removes the machined workpieces from the system.

To form water pressure main lines, drain lines, sewer lines, and other continuous conduits or pipes, pipe sections of hardened, compressed, fibro-cement composition, and more particularly of asbestos-cement, are suitably joined together with cylindrical pipe couplings or sleeves of similar composition. These couplings must join the pipe in a leakproof manner, and the joints must be capable of containing fluids in which the pressures may range as high as 300 p.s.i. To provide a leakproof coupling for asbestos-cement pipe, it is desirable to internally machine the coupling so that it may receive an annular resilient gasket of rubber, or the like, to seal the end surface of the pipe against the internal surface of the coupling.

An asbestos-cement coupling of this type which is designed to provide the desired leakproof connection between sections of asbestos-cement pipe is described in U.S. Patent No. 2,738,992 to Heisler. This coupling has two (2) internal annular grooves of a specific configuration. Each groove contains a resilient gasket that permits joining of the pipe sections in a leakproof manner. The particular configuration of the grooves further permits pipe sections to be joined by a pipe coupling with a minimum of effort.

Workpieces in general, and pipe couplings in particular, have been machined in the past by manually inserting the workpeices in a machine tool and then manually removing them once the machining operation is complete. To machine these couplings, it has therefore been necessary for a machine tool operator to perform a series of steps, including loading the machine tool chuck with the coupling, starting the machine, advancing the cutting tool to perform the required machining operation, stopping the machine, removing the coupling, and inspecting the machined product. Valuable operating time is thus lost by this method of operation, because the machine necessarily remains idle for extended periods of time while the operator performs the required steps in the machining operation.

It is therefore desirable to provide a system for automatically feeding workpieces, and more particularly pipe couplings, to a machine lathe and for discharging them from the lathe to relieve the operator from having to manually control the machine and to increase the speed, efficiency, and precision with which the machining operations are performed. With an automatic feeding and discharging system the operator need only supply unmachined couplings to the system and transfer or store machined couplings as they are removed from the system. Such a system thus provides the operator with ample time to inspect and gauge the finished product. By automating the machine cycle, including the orienting, feeding, machining, machine-discharging, and removing of the couplings, and reducing the responsibilities of the machine operator, an increase in both the quality of the machined couplings and the quantity produced is realized.

It is accordingly a primary object of this invention to provide a new and improved system that automatically orients workpieces, feeds them in sequence to a machine tool, machines them, discharges them from the machine tool, and removes machined workpieces from the system, whereby an entire machining operation can be automatically performed in a precise, efficient, quick, and trouble-free manner.

It is another object of one embodiment of this invention to provide an automatic system that orients pipe couplings, feeds them in sequence to a machine tool, machines them, discharges them from the machine tool, and removes machined workpieces from the system.

Still another object of one embodiment of this invention is to provide a system that automatically orients pipe couplings, feeds them in sequence to a machine-charging device, charges them to a machine lathe, machines them, discharges them from the machine lathe, and removes the machined coupling from the system, thereby relieving a machine operator of the time, effort, and responsibility of having to manually perform these steps in a machining operation.

Yet another object of one embodiment of this invention is to provide a system for continuously orienting and feeding pipe couplings from a stack containing a plurality of unmachined couplings to a machine lathe and for continuously discharging machined couplings from the lathe and removing them to another stack containing a plurality of machined couplings.

A further object of one embodiment of this invention is to provide an automatic system for orienting asbestos-cement pipe couplings, feeding them in sequence to a machine lathe, machining them, discharge them, and removing them from the system—the system being adaptable to any size coupling and any conventional size lathe.

A still further obpject of this invention is to provide a new and improved orienting, feeding, discharging, and removing system for machining workpieces that is simplified in construction and operation over prior art systems; that is reliable; that is efficient and economical; and that reduces maintenance costs and wear and tear on the machine tool.

Additional objects and advantages of this invention will be set forth in part in the description which follows and in part will be obvious from the description or may be learned by practice of the invention, the objects and advantages being realized and attained by means of the machines, instrumentalities, devices, and combinations particularly pointed out in the appended claims.

To achieve the foregoing objects and in accordance with its purpose, this invention, as embodied and broadly described, comprises: an automatic system for use with a machine tool having an axis and a chuck for securing a cylindrical workpiece for rotary movement on the machine tool axis. The system automatically feeds workpieces in sequence to the machine tool for machining, and automatically discharges machined workpieces from the tool and removes them from the system when machining is completed.

The system includes a feed trough having a bed of sufficient length to hold a plurality of workpieces in axial alignment and advancing means for advancing the workpieces along the trough to a machine-charging position at one end of the feed trough adjacent the machine tool chuck. Machine cycling means are provided for actuating and controlling the advancing means to successively feed workpieces along the trough to the machine-charging position, and feeding control means are also provided for signaling the machine cycling means to stop movement of the advancing means when the most advanced workpiece reaches the machine-charging position.

The system further includes a machine-charging device having a charge arm and a discharge arm. Each of these arms is mounted for both pivotal movement on and axial movement along an arm axis that is parallel to and spaced apart from the machine tool axis. Each arm also carries gripping means actuated and controlled by the machine cycling means. This gripping means engages and grips the internal surface of each workpiece.

The charge arm is pivotally and axially moved by the machine cycling means to charge an unmachined workpiece from the machine-charging position on the feed trough to the machine tool chuck, and similarly, the discharge arm is pivotally and axially moved by the machine cycling means to discharge a machined workpiece from the machine tool chuck to a machine-discharging position. The machine cycling means also actuates and controls the advancing means to hold the workpieces in the trough against axial movement while the gripping means on the charge arm engages a workpiece at the machine-charging position.

The system still further includes removing means for removing machined workpieces from the machine-discharging position. In accordance with the invention, the system thus automatically and continuously orients and feeds workpieces in sequence to the machine tool for machining operations, and automatically discharges machined workpieces from the machine tool and removes them from the system upon completion of machining.

The accompanying drawings which are incorporated in and constitute a part of this specification illustrate an embodiment of the invention and, together with the description, serve to explain the principles of this invention.

Of the drawings:

FIG. 1 is a plan view of the automatic system of this invention illustrating the machine tool and its associated automatic orienting, feeding, discharging, and removing machinery;

FIG. 2 is a sectional view taken along the line 2—2 of FIG. 1;

FIG. 3 is an end view, partially in section, as viewed from the line 3—3 of FIG. 1;

FIGS. 4–6 are a series of end views similar to FIG. 3 and show the sequence of operating steps of the machine-charging device;

FIGS. 7–9 correspond to FIGS. 4–6 but are top views of the machine-charging device showing the same sequence of operating steps as shown in FIGS. 4–6; and FIG. 10 is an enlarged fragmentary view showing the expandable gripping mechanism on an arm of the machine-charging device for internally gripping pipe couplings and the relationship of a coupling to the machine tool chuck when the coupling is mounted in the chuck in position for machining.

It is to be understood that both the foregoing general description and the following detailed description are exemplary and explanatory but are not restrictive of the invention.

Reference will now be made in detail to the present preferred embodiment of the invention, an example of which is illustrated in the accompanying drawings.

As shown in FIG. 1, the present invention provides an automatic system for performing orienting, feeding, machining, discharging, and removing operations on cylindrical workpieces, and more particularly asbestos-cement pipe couplings, in cooperation with a machine lathe to automatically achieve machining of the workpieces. Unmachined couplings 12 are supplied on a pallet 14 and finish-machined couplings 16 are stacked on a tray 18 for subsequent treatment, such as curing of the asbestos-cement couplings.

In accordance with the invention, means are provided for automatically orienting and feeding a continuous supply of unmachined pipe couplings to the machine lathe. As embodied and as shown in FIG. 2, this means includes a downwardly inclined feed chute 20 adapted to hold a plurality of unmachined pipe couplings 12 in a manner whereby the couplings are free to roll down the chute under the force of gravity. At any one time, a plurality of couplings can thus be placed on chute 20 from pallet 12 by the machine operator, relieving him of the need to continuously supply couplings to the system. The length of the chute 20 determines the number of couplings that can be placed in readiness for continuous feeding by the operator at one time. Feed chute 20 is also of suitable width to accommodate the various conventional sizes of pipe couplings that are desired to be machined.

The bottom of the chute 20 is preferably constructed of a plurality of longitudinal bars 22 resting on edge. Longitudinal bars 22 curve upwardly at their lower ends to create a stop 23 and provide an intermediate holding position for the couplings as they roll down inclined chute 20. Feed chute 20 is supported at its upper end by a support roller 24 secured to an adjustable supporting post 26 and at its lower end by the supporting structure of an inclined feed conveyor 27 through a pin-and-slot engagement 29. The pin-and-slot engagement 29 also serves the function of permitting pivotal adjustment of the elevation of feed chute 20.

The upwardly inclined feed conveyor, shown generally at 27, comprises an endless belt 28, a driven head pulley 30, and an adjustable tail pulley 32. Conveyor 27 also includes a plurality of serrated flights 34 attached to endless belt 28. These flights 34 intermesh with and pass between the upturned ends 23 of bars 22 of feed chute 20. In operation, the pipe coupling resting in the intermediate holding position at the bottom of chute 20 is caught and lifted from the chute by use of the flights 34 on conveyor 28 as the flights pass between bars 22. In this manner, and as shown in FIGS. 1 and 2, conveyor 27 delivers the couplings 12 one at a time into a feed trough 36.

As shown in FIGS. 1 and 2, a transfer member 38, secured to feed trough 36, is provided between the head of inclined conveyor 27 and the trough. Transfer member 38 comprises a plurality of fingers 40 (FIG. 1) which intermesh with the serrated flights 34 on belt 28. This arrangement, in accordance with the invention, permits the flights 34 to push the couplings 12 from conveyor 27 and transfer them into trough 36.

As shown in FIG. 2, feed trough 36 has a depressed or V-shaped cross-section and is of sufficient length to hold a plurality of couplings 12 in axial alignment. An adjustable stop 42 is provided on one side of feed trough 36 to align couplings 12 in the proper position in the feed trough as they roll off inclined conveyor 27 across transfer member 38 and into trough 36. As shown in FIG. 2, feed trough 36 is supported by a plurality of adjustable screw jacks 44 so that the trough elevation can be adjusted relative to the head end of inclined conveyor 27 to accommodate the various sizes of pipe couplings to be machined.

In accordance with the invention, conveyor control means are provided to control the rate at which inclined feed conveyor 27 supplies couplings to the receiving end 45 of feed trough 36. As embodied, this means comprises an electric eye system consisting of a source of light 46 emitting a beam of light 48 directed to impinge upon a light sensitive element or photoelectric cell 50 located on the opposite side of and diagonally across the receiving end 45 of feed trough 36 from the light source. As will be described more fully below, the electric eye system controls the movement of power-driven feed conveyor 27.

Further, in accordance with the invention, means are provided to advance the plurality of axially aligned couplings 12 along feed trough 36 toward a machine-charging position at the charging end 58 of the trough. As embodied, this means comprises a pneumatic pusher 54, operated by pneumatic cylinder 56. The stroke of pneumatic pusher 54 is regulated by controlled air pressure to pneumatic cylinder 56 and is equipped to execute two (2) functions by performing two (2) distinct strokes to control the movement of the couplings 12 along trough 36 during operation of the feeding and discharging system of this invention.

A first stroke of pusher 54 acts periodically to push the aligned couplings 12 one coupling width along trough 36, retracting after each advance to permit the receipt of a new coupling 12 from feed conveyor 27 at the receiving end 45 of the feed trough. A second stroke of pusher 54 acts to hold couplings 12 with a controlled force against axial movement away from the charging end 58 of trough 36.

In keeping with the concept of this invention, machine cycling means are provided to control the sequence and timing of certain operations performed by the automatic system of the invention. As embodied, this machine cycling means comprises electric control circuits that actuate pneumatic and hydraulic cylinders, and other machine mechanisms in a timed progression of steps responsive to signals from the electric control circuits. The machine cycling means itself is not illustrated in detail, since it is conventional and is within the knowledge of those skilled in the art.

In operation, pusher 54 is actuated by the machine cycling means and operates under its first stroke to push the line of couplings 12 in feed trough 36 one coupling width along the trough. Pusher 54 operates under a timed progression of steps, retracting after each advance to permit the deposit of a new coupling from feed conveyor 27 at the receiving end 45 of feed trough 36.

Consonant with the invention, feeding control means are provided for signaling the machine cycling means to stop movement of pneumatic pusher 54 under its first stroke when the most advanced coupling 12 on feed trough 36 reaches the machine-charging position. As embodied, this feeding control means comprises a second electric eye system consisting of a light source 62 emitting a light beam 64 directed to impinge upon a light sensitive element or photoelectric cell 66 positioned on the opposite side of feed trough 36 from light source 62 at charging end 58 of trough 36.

When the most advanced coupling on the feed trough interrupts light beam 64 of the second electric eye system, this interruption signals the machine cycling means to retract pusher 54 and stop further movement of pusher 54 under its first stroke. This retraction permits the first electric eye system to signal conveyor 27 to deliver another coupling to the receiving end 45 of trough 36. The machine cycling means then causes pusher 54 to advance on its second stroke to hold the line of couplings with a controlled force against axial movement away from the charging end 58 of trough 36. The purpose of the second stroke will become apparent as the description of the system and its operation proceeds.

In conformity with the invention, means are provided for automatically picking up couplings, charging them onto a machine lathe chuck, removing machined couplings from the chuck, and discharging finished couplings at a machine-discharging position on a removal chute. As embodied and as shown in FIGS. 3–6, this means comprises a machine-charging device, shown generally at 68, having a charge arm 72 and a discharge arm 74 which are pivotally mounted for rotation on axes parallel to and spaced apart from the axis 80 of lathe 70.

Means are provided for pivotally and axially moving the charge and discharge arms to charge and discharge couplings, respectively, to and from the lathe. As embodied, this means includes shafts 76 and 78 connected to the charge arm 72 and discharge arm 74, respectively, and rotatably mounted on supports 82 and 83, respectively, as shown in FIG. 1. Rods 76 and 78 are operatively connected through radial cranks 86 and 87 for pivotal movement by hydraulic cylinders 88 and 89. The supports and hydraulic cylinders are all anchored on platform 90 which is mounted to reciprocate longitudinally with respect to axis 80 of machine lathe 70 along ways 92.

The machine lathe 70 includes a tool 95 for machining the desired annular grooves on the internal surface of couplings 12. Tool 95 is mounted on a platform 96 which reciprocates along ways 98 in a direction parallel to axis 80 of lathe 70.

The platform 90 for the charge and discharge arms and the platform 96 for tool 95 are reciprocated by conventional mechanical means well known to those skilled in the art, and their reciprocal movement is timed and controlled by the independent machine cycling means.

In accordance with the invention, gripping means are provided on both the charge and discharge arms to firmly engage and grip the internal surfaces of the couplings 12. The gripping means provides both smooth engagement and ease of release in picking up and discharging couplings.

As embodied and shown in FIG. 10, this gripping means comprises an expandable gripping member shown generally at 100, mounted on the lower ends of charge arm 72 and discharge arm 74. This gripping member 100 engages couplings 12 and holds them on the charge and discharge arms as these arms move between the various machine operating positions.

The gripping member 100 consists of a plurality of primary wedge-shaped pieces 102 containing peripheral grooves 104 which hold resilient annular bands 106 and which have internal radial slots 108 adapted to engage and slide on a disc 110. Resilient annular bands 106 exert a radially inward force on wedge-shaped pieces 102 that, in the absence of a sufficient countervailing force, will cause pieces 102 to move radially inward on disc 110. Disc 110 is slidably mounted on piston rod 112 of a hydraulic cylinder 114 which is mounted on charge and discharge arms 72 and 74, respectively. One secondary wedge-shaped piece 116 of a pair, 116 and 117, is slidably mounted on rod 112 between primary wedge-shaped pieces 102 and cap 118 of hydraulic cylinder 114. The other secondary wedge-shaped piece 117 is mounted on rod 112 between the primary wedge-shaped pieces 102 and a stop 119 on the end of rod 112.

In operation, as piston rod 112 of hydraulic cylinder 114 is retracted, outer secondary wedge 117 is pulled toward inner secondary wedge 116, forcing the primary wedge-shaped pieces 102 to move outward and frictionally engage the internal surface of a coupling 12, thereby securing the coupling to one of the arms of the machine-charging device. Upon release of hydraulic cylinder 114, secondary wedge-shaped pieces 116 and 117 are free to move axially apart, and the annular resilient bands 106 pull primary wedge-shaped pieces 102 radially inward sliding them along disc 110, thereby releasing the grip of gripping member 100 on the coupling.

As shown in FIG. 10, the charge and discharge arms 72 and 74 also include a pusher ring 120 directly behind the gripping member 100. Pusher ring 120 is advanced axially by an air cylinder 122 and serves to push the unmachined coupling 12 all the way into the chuck 124 of lathe 70, after the gripping member 100 has released its grip on the coupling.

To align coupling 12 with respect to chuck 124 of lathe 70, so that the coupling will be in the correct position for machining, an adjustable backstop 126 is provided on lathe 70 which, in combination with pusher ring 120, assures that the coupling is correctly and evenly placed in lathe chuck 124. Lathe chuck 124 may be of any conventional automatic type that will serve to axially align and grip the exterior surface of coupling 12 for rotary movement concentric with the axis 80 of lathe 70.

In accordance with the invention, means are provided for removing machined couplings from the automatic system and placing them at a collecting or inspecting station afer they have been discharged by the machine-charging device 68 at machine-discharging position 134. As embodied and as shown in FIGS. 1 and 3, this means comprises a downwardly inclined removal chute 130 that permits machined couplings 16 to roll by gravity away from machine tool 70 after they have been discharged by discharge arm 74 of the machine-charging device 68. Chute 130 is supported by an adjustable screw jack 136 at one end and by a roller mounted support 138 at the other end. This arrangement permits removal chute 130 to be adjusted to accommodate various sizes of couplings and avoid the need for any adjustment to discharge arm 74 of the machine-charging device 68.

Consonant with the invention, workpiece holding means are provided at discharge position 134 of chute 130 to prevent workpieces or machined couplings 16 from commencing to roll down removal chute 130 before they are completely disengaged from and released by gripping member 100 of discharge arm 74. As embodied and as shown in FIG. 3, this means comprises a lever 140 pivotally mounted to form a V with the inclined surface of chute 130 and supported by a hydraulic cylinder 142 secured to the structure of the chute. This lever 140 is designed to momentarily hold a machined coupling until gripping member 100 on discharge arm 74 has released the machined coupling 16. Once coupling 16 is released, cylinder 142 is actuated by the machine cycling means and causes lever 140 to pivot downward, allowing coupling 16 to roll down discharge chute 130.

In operation of the automatic system of this invention, unmachined couplings 12 are placed on feed chute 20 by the machine operator, and the couplings roll down the chute by gravity until they come to rest at the bottom 23 of chute 20. The operator supplies a plurality of couplings to feed chute 20 to maintain the automatic system of this invention on a continuous basis. Inclined conveyor 27 is then turned on, and it continues in operation because initially there is no coupling interrupting electric eye beam 48 at the receiving end 45 of feed trough 36.

The serrated flights 34 on inclined conveyor 27 will remove one coupling 12 at a time from the bottom of feed chute 20, and as one coupling is removed, the rest will roll down by gravity into the proper position to be picked up by the next succeeding flight 34 of inclined conveyor 27. Upon reaching the top of inclined conveyor 27, the couplings 12 will roll off across transfer member 38 and against stop 42 of feed trough 36 and come to rest within the V-shaped portion of the trough. With a coupling 12 now at the receiving end 45 of feed trough 36, electric eye beam 48 is interrupted and this causes inclined feed conveyor 27 to be brought to a stop.

The machine cycling means is then initiated to control the sequence and timing of the operations performed by the automatic system of this invention. The machine cycling means initially actuates pneumatic pusher 54 and operates it under its first stroke to push coupling 12 approximately one coupling width along the length of trough 36. With movement of the first coupling to this new position on the trough, pusher 54 retracts and light beam 48 from electric eye 46 to cell 50 is reestablished, and this causes inclined conveyor 27 to again operate and deposit a second coupling at receiving end 45 of feed trough 36. Pusher 54 operates under a timed progression by pushing the deposited couplings 12 one coupling width along trough 36 and by then retracting and permitting deposit of a new coupling until the first deposited and most advanced coupling eventually interrupts light beam 64 from electric eye 62 to cell 66 at the charging end 58 of feed trough 36.

The movement of pneumatic pusher 54 under the first stroke is brought to a stop by operation of electric eye 62. When light beam 64 of electric eye 62 is interrupted by the most advanced coupling, this signals the machine cycling means to retract pusher 54 and stop further movement of pusher 54 under its first stroke until light beam 64 is again received by cell 66. A new coupling 12 will, however, be deposited at receiving end 45 of trough 36 since it is now vacant. The stroke of pneumatic pusher 54 is adjusted to the width of the couplings 12 being fed by the system so that the first coupling in line will be in the proper position for pickup by charge arm 72 of machine-charging device 68.

The interruption of light beam 64 by the first coupling 12 to reach the charging end 58 of feed trough 36 also signals the machine cycling means to actuate the machine-charging device and the second stroke of pusher 54 under an automatic timed progression or sequence of steps.

For convenience, the operation of machine-charging device 68 will be described as if the system had been operating for a time and a machine coupling 16 was ready to be discharged from lathe 70. It will be understood, of course, that initially the charging of the first coupling to the machine would be carried out in the same manner but that the discharge arm would operate without having any coupling secured to it.

The initial position of charge arm 70 and discharge arm 72 is shown in FIGS. 4 and 7, where charge arm 72 has been pivoted to a position adjacent feed trough 36 and discharge arm 74 to a position adjacent lathe chuck 124 by simultaneous actuation of hydraulic cylinders 88 and 89, respectively. Responsive to a signal from the machine cycling means, platform 90 is then retracted longitudinally, as by a hydraulic cylinder (not shown) parallel to lathe axis 80, which causes arms 72 and 74 to move in the direction of arrows 146 (see FIG. 7). This movement of platform 90 also causes gripping mechanism 100 on charge arm 72 to slide into an unmachined coupling 12 at machine-charging position 58 on feed trough 36 and causes gripping mechanism 100 on discharge arm 74 to slide into a machined coupling 16 positioned in chuck 124 of lathe 70.

At the same time that charge arm 72 is engaging unmachined coupling 12 at charging position 58 of feed trough 36, the machine cycling means causes pneumatic pusher 54 to operate under its second stroke to hold the couplings in feed trough 36 against any axial movement away from charging position 58, and thereby assure that gripping mechanism 100 secures a full engagement into coupling 12. Hydraulic cylinders 114 is both arms 72 and 74 are then simultaneously actuated by the machine cycle to cause gripping members 100 to expand and engage the inside surfaces of couplings 12 and 16. As gripping mechanism 100 on discharge arm 74 engages machined coupling 16, chuck 124 of lathe 70 simultaneaously opens to release the machined coupling.

The machine cycle then actuates platform 90 to advance axially in the direction of arrows 147, as shown in FIG. 7. Discharge arm 74 removes machined coupling 16 from lathe chuck 124, while charge arm 72 removes unmachined coupling 12 from feed trough 36. Hydraulic cylinders 88 and 89 on platform 90 are then simultaneously actuated to pivot charge arm 72 and discharge arm 74 to the positions shown in FIGS. 5 and 8.

Responsive to the machine cycling means, pusher 54 retracts to its initial position after charge arm 72 has removed coupling 12 from the charging end 58 of feed trough 36. Since a coupling has been removed from feed trough 36, light beam 64 of electric eye 62 is again received by cell 66 and this signals the machine cycling means to actuate pusher 54 again under its first stroke to advance couplings 12 one coupling width long trough 36 and place the next coupling in the charging position 58. This advancement of the couplings vacates receiving end 45 of trough 36 and actuates conveyor 27 to deposit a new coupling 12 in feed trough 36, thereby orienting and feeding the couplings on a continuous and automatic basis to the machine-charging position.

With the arms 72 and 74 in the position as shown in FIGS. 5 and 8, platform 90 of the machine charging device again retracts responsive to the machine cycling means and moves the arms 72 and 74 in the direction shown by arrow 148 in FIG. 8. This series of actions inserts unmachined coupling 12 into chuck 124 of lathe 70, and simultaneously places machined coupling 16 at machine-discharging position 134 on removal chute 130. Gripping members 100 on arms 72 and 74 are then released. Machined coupling 16 is released and held at machine-discharging position 134 by lever 140 and unmachined coupling 12 is held by chuck 124.

Responsive to the machine cycle, as gripping member 100 on charge arm 72 releases coupling 12, pusher ring 120 on charge arm 72 is actuated and pushes coupling 12 against backstop 126 of chuck 124 to insure proper positioning of the coupling in the jaws of the chuck. The jaws of chuck 124 move inward simultaneously to chuck the inserted coupling and automatically center it on the axis of lathe 70.

After release of the couplings 12 and 16 by arms 72 and 74, platform 90 is advanced axially away from lathe 70 in the direction of arrow 149 as shown in FIG. 8, and hydraulic cylinder 88 of charge arm 72, only, is actuated to pivot arm 72 back to its initial position adjacent charging end 58 of feed trough 36. The locations of the arms are now as shown in FIGS. 6 and 9.

Tool 95 moves axially in the direction of arrow 150 (see FIG. 9) on its platform 96 into a machining position, while hydraulic cylinder 142 on removal chute 130 pulls holding lever 140 down and releases machined coupling 16, permitting it to roll by gravity down removal chute 130, as shown in FIG. 6. Lathe 70 then starts rotating coupling 12 in chuck 124 concentric with axis 80 of lathe 70. Tool 95 is then moved transverse to lathe axis 80 by a suitable cross-feed mechanism and engages the internal surface of coupling 12 to perform the desired machining operation. When machining is complete, the machine cycling means causes tool 95 to return to its axial location, lathe 70 to stop, and tool platform 96 to retract axially away from lathe chuck 124 to the position shown in phantom in FIG. 9.

Hydraulic cylinder 89 of discharge arm 74, only, is then actuated to pivot discharge arm 74 to a position adjacent lathe chuck 124. Charge arm 72 and discharge arm 74 are then once more in their original positions shown in FIGS. 4 and 7. Charge arm 72 is thus in position to remove a new unmachined coupling 12 from feed trough 36, and discharge arm 74 is in position to remove a machined coupling 16 from lathe chuck 124, and the sequence of steps described above is repeated. The machine-charging device and machine tool of this inventive system thus operate on an automatic and continuous basis, charging unmachined couplings, machining them, and discharging machined couplings in a planned sequence of steps.

Removal chute 130 permits a plurality of machined couplings to be stacked at the bottom of the chute where the machine operator can easily remove them and inspect them for proper machining. The operator can then stack the machined couplings 16 on a suitable tray 18 for any desired subsequent operations, such as curing.

While a system has been shown for automatically feeding and discharging asbestos-cement couplings, it will be appreciated that similar cylindrical-shaped articles that require internal machining operations are also compatible with the system of this invention.

Additional means may also be provided for automatically supplying unmachined couplings 12 to feed chute 20 and for automatically removing machined couplings 16 from removal chute 130 and stacking them on a suitable pallet or tray, without departing from the scope of this invention.

The present invention, therefore, provides a practical means for orienting, feeding, and charging a plurality of cylindrical workpieces, and more particularly asbestos-cement pipe couplings, on an automatic and continuous basis to a machine tool and for discharging them from the tool and removing them from the system after the machining operation has been completed. This system relieves the operator of a great amount of time and effort that was previously required to perform these operations, thereby drastically increasing the efficiency and economy of the entire machining operation. With this invention, the operator has ample time to stockpile unmachined couplings for introduction into the automatic system of this invention and ample time to remove, stack, and inspect machined couplings as they are delivered at a collecting point after being automatically removed from the system.

The invention in its broader aspects is not limited to the specific details shown and described, but departures may be made from such details within the scope of the accompanying claims without departing from the principles of the invention and without sacrificing its chief advantages.

What is claimed is:

1. In a machine tool having an axis and a chuck for securing a hollow cylindrical workpiece for rotary movement on the machine tool axis, a system for automatically feeding in sequence workpieces to the machine tool for machining and automatically discharging machined workpieces from the machine tool and removing them from the system, which system comprises:

(a) a feed trough having a bed of sufficient length to hold a plurality of workpieces in axial alignment;
 (b) advancing means for advancing the workpieces along the trough toward a machine-charging position at one end of the feed trough adjacent the machine tool chuck;
 (c) machine cycling means for actuating and controlling the advancing means to successively feed workpieces along the trough to the machine-charging position;
 (d) feeding control means for signaling the machine cycling means to stop movement of the advancing means when the most advanced workpiece reaches the machine-charging position;
 (e) a machine-charging device having a charge arm and a discharge arm, each of said arms being mounted for pivotal movement on and axial movement along an arm axis parallel to and spaced apart from the machine tool axis;
 (f) gripping means actuated and controlled by the machine cycling means and carried by each arm to engage and grip the internal surface of workpieces;
 (g) the machine cycling means pivotally and axially moving the charge arm to charge an unmachined workpiece from the machine-charging position on the feed trough to the machine tool chuck and pivotally and axially moving the discharge arm to discharge a machined workpiece from the machine tool chuck to a machine-discharging position;
 (h) said machine cycling means also actuating and controlling the advancing means to hold the workpieces against axial movement while the gripping means on the charge arm engages a workpiece at the machine-charging position; and
 (i) removing means for removing machined workpieces from the machine-discharging position, whereby workpieces are automatically and continuously fed in sequence to the machine tool for machining operations, and are automatically discharged from the machine tool and removed from the system upon completion of machining.

2. The invention as defined in claim 1, in which the removing means comprises:
  (a) a downwardly inclined removal chute adjacent the machine tool chuck for receiving machined workpieces discharged by the discharge arm at the machine-discharging position;
  (b) workpiece holding means for preventing workpieces, as they are discharged, from rolling down the removal chute and for holding each workpiece at the machine-discharging position until the workpiece is fully released by the gripping means on the discharge arm; and
  (c) releasing means controlled by the machine cycling means for releasing said workpiece holding means to allow the discharged workpiece to roll down the removal chute after it has been released by the gripping means on the discharge arm.

3. The invention as defined in claim 2, in which:
  (a) the workpiece holding means comprises a lever that is pivotally mounted on the removal chute at the machine-discharging position;
  (b) the releasing means comprises a hydraulic cylinder supporting the lever at an angle to the downwardly inclined removal chute; and
  (c) the machine cycling means actuates said hydraulic cylinder to permit the lever to pivot downward to release a workpiece and permit it to roll down the removal chute.

4. The invention as defined in claim 1, which also includes feeding means for feeding workpieces to a receiving end of the feed trough remote from the machine-charging position, said feeding means comprising:
  (a) a downwardly inclined feed chute including a stop at its lower end, the feed chut directing a plurality of unmachined workpieces by gravity against the stop at an intermediate holding position;
  (b) an upwardly inclined conveyor having a plurality of spaced workpiece engaging arms attached thereto, said arms selectively removing workpieces one at a time from the intermediate holding position with movement of the conveyor, and said conveyor discharging the workpieces into the receiving end of the feed trough in front of the advancing means; and
  (c) conveyor control means for actuating and stopping movement of the conveyor.

5. The invention as defined in claim 4, in which the conveyor control means comprises:

(a) a source of light on one side of the feed trough emitting and directing a light beam across the feed trough at its receiving end; and
  (b) a light sensitive element on the opposite side of the trough to receive the beam of light when the receiving end is vacant of a workpiece, said light sensitive element selectively actuating and controlling the conveyor to feed workpieces to the receiving end of the feed trough when light is received by the element.

6. The invention as defined in claim 1, in which the advancing means comprises a pneumatic pusher for pushing the plurality of axially-aligned workpieces along the feed trough to the machine-charging position under a first stroke controlled by said machine cycling means and the feeding control means, said pusher also holding the workpieces against axial movement away from the machine-charging position under a second stroke controlled by said machine cycling means.

7. The invention as defined in claim 6, in which the feeding control means comprises:
  (a) a light source on one side of the feed trough emitting and directing a beam of light across the trough at the machine-charging position; and
  (b) a light sensitive element mounted on the opposite side of the trough to receive the light beam when the machine-charging position is vacant of a workpiece, said light sensitive element signaling the machine cycling means to actuate the pneumatic pusher to push workpieces along the feed trough to the machine-charging position when light is received by the element.

8. The invention as defined in claim 1, in which the cylindrical workpieces are pipe couplings and the gripping means on the charge arm and discharge arm comprises a plurality of members forced radially outward responsive to actuation by the machine cycling means to frictionally grip the internal surface of the couplings.

References Cited

UNITED STATES PATENTS

| | | |
|---|---|---|
| 2,728,253 | 12/1955 | Gettig. |
| 3,011,410 | 12/1961 | Gates et al. _____ 82—2.7 XR |
| 3,226,886 | 1/1966 | Seidel _____ 82—2.7 XR |

LEONIDAS VLACHOS, Primary Examiner

U.S. Cl. X.R.

10—107; 82—48